Feb. 6, 1940.  F. P. HEALY  2,189,604
BORING BAR GUIDING MECHANISM
Filed July 17, 1937  4 Sheets-Sheet 1
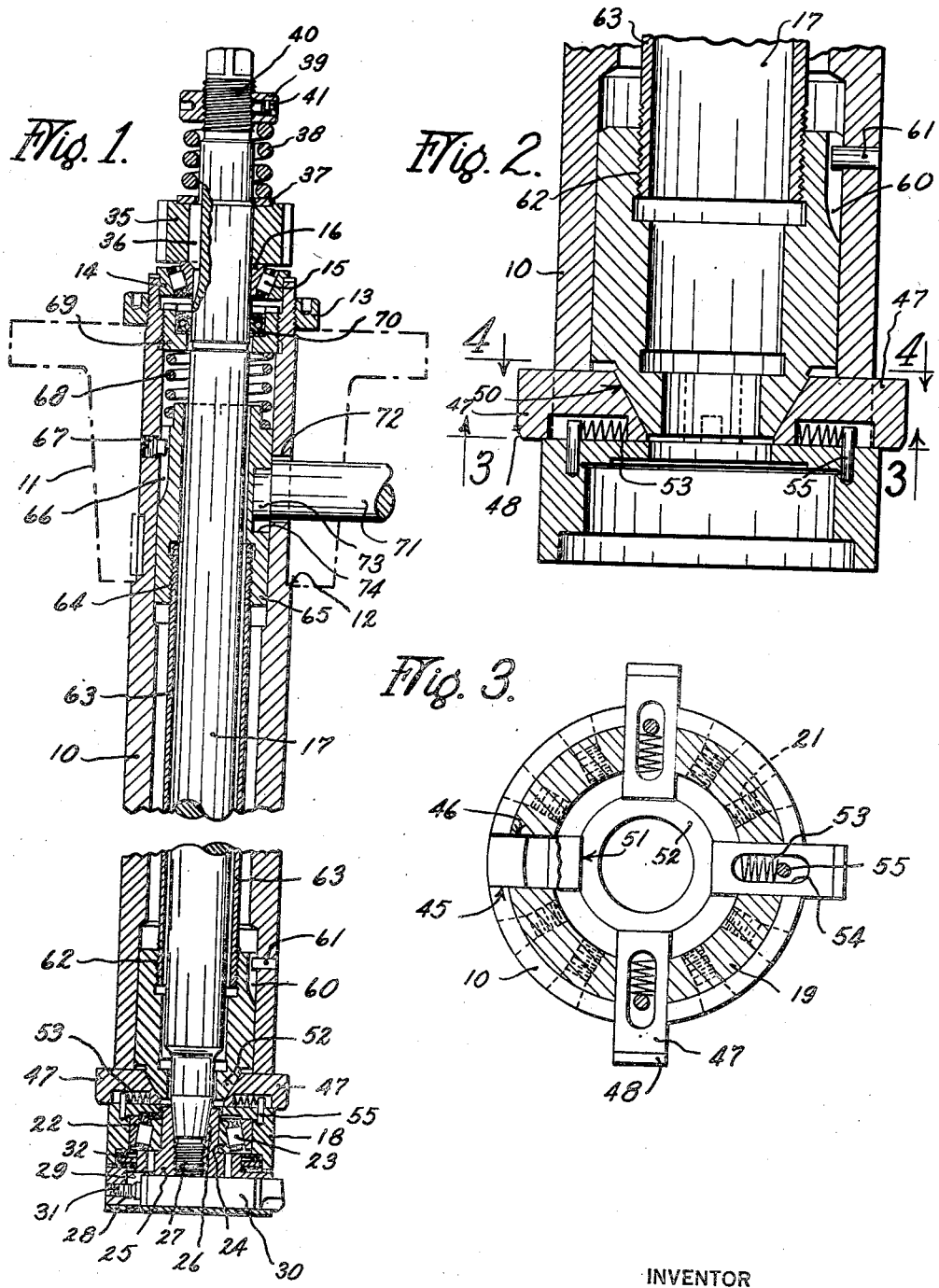
INVENTOR
FRANCIS P. HEALY
BY
Chapin + Neal
ATTORNEYS Feb. 6, 1940.　　　　　F. P. HEALY　　　　　2,189,604
BORING BAR GUIDING MECHANISM
Filed July 17, 1937　　　　4 Sheets-Sheet 2

INVENTOR
FRANCIS P. HEALY
BY Chapin + Neal
ATTORNEYS

Feb. 6, 1940.  F. P. HEALY  2,189,604
BORING BAR GUIDING MECHANISM
Filed July 17, 1937 4 Sheets-Sheet 3
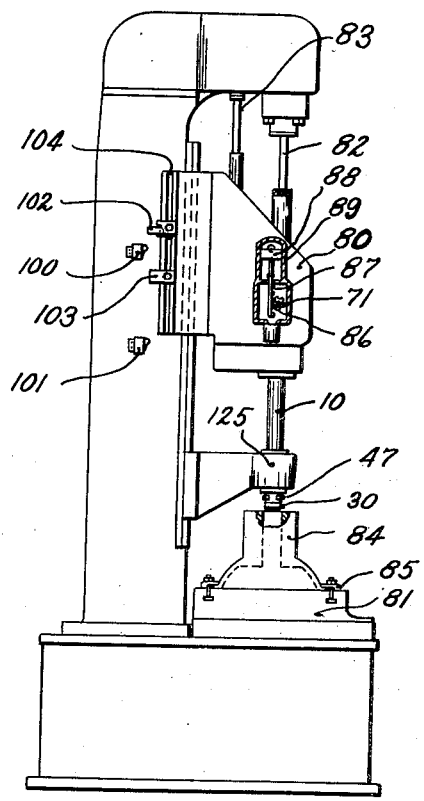
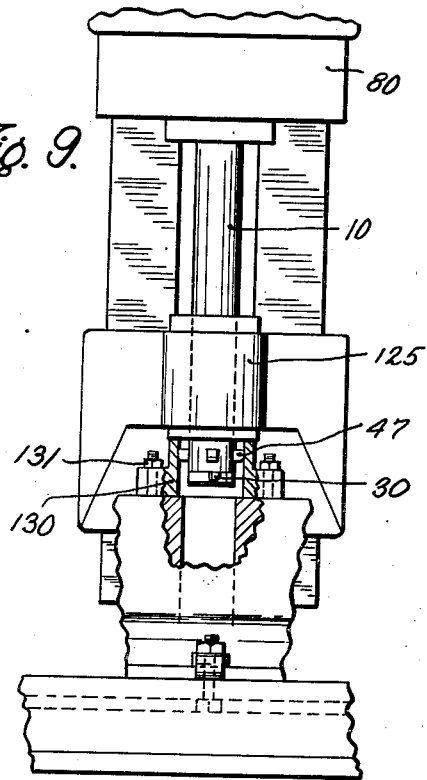
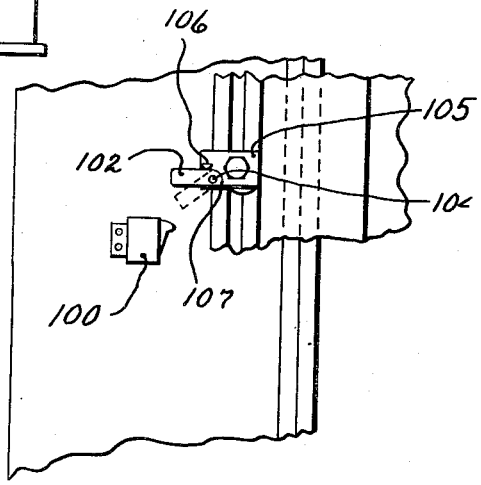
INVENTOR
*Francis P. Healy*
BY
*Chapin + Neal*
ATTORNEYS

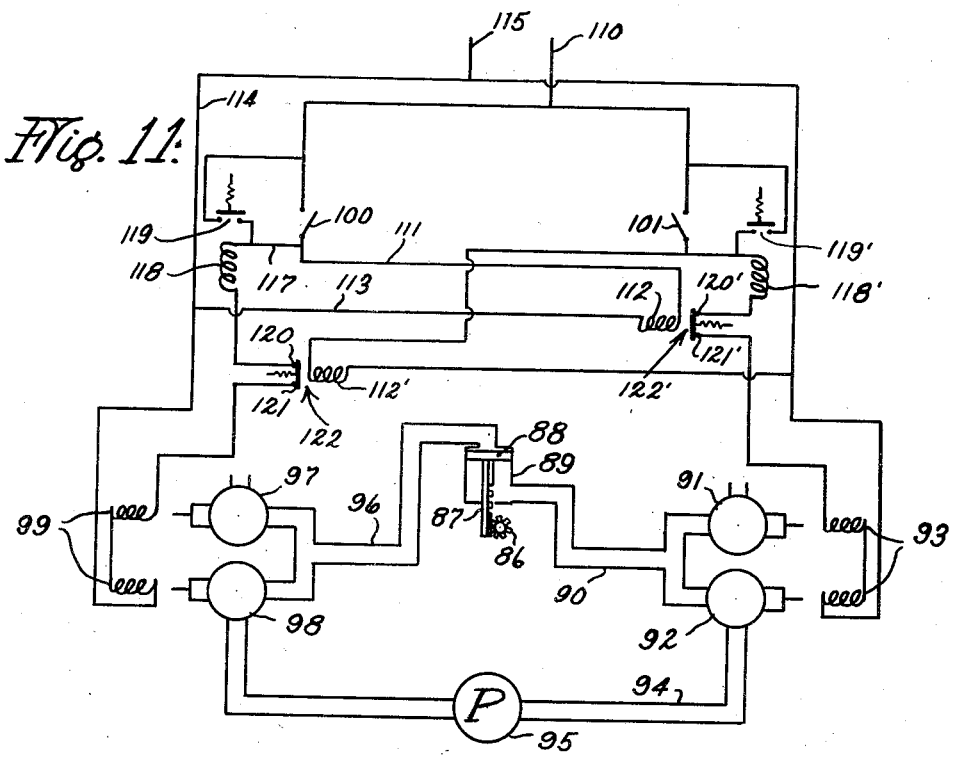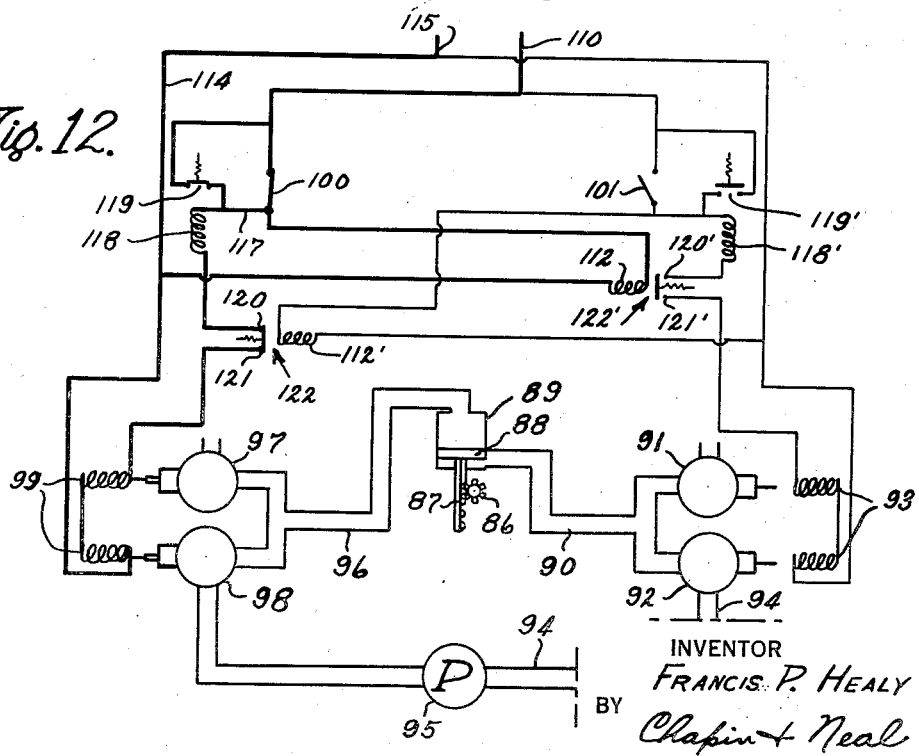

Patented Feb. 6, 1940

2,189,604

UNITED STATES PATENT OFFICE 2,189,604

BORING BAR GUIDING MECHANISM

Francis P. Healy, Springfield, Mass., assignor to Van Norman Machine Tool Company, Springfield, Mass., a corporation of Massachusetts Application July 17, 1937, Serial No. 154,269

4 Claims. (Cl. 77—4)

This invention relates to boring devices of precision, and has particular reference to mechanism for guiding the cutter during the boring operation.

In accordance with the invention the cutter guiding devices are given an improved control over the cutter by providing them with expanding mechanism which holds them rigidly in contact with the bore wall until the inward pressure on the guide fingers exceeds a predetermined maximum, while permitting them to yield when this pressure is exceeded. By setting this limiting pressure above that caused by the reaction of the cutting tool the latter is held rigidly under all normal conditions.

In accordance with a further feature of the invention the cutter guiding devices are automatically controlled in accordance with the position of the boring bar in the bore. This is in part made possible by the provision of improved expanding mechanism for the cutter guiding fingers which is inherently suited to automatic control.

In accordance with a further feature of the invention the guiding of the cutter at the beginning of the boring operation is improved by causing the guiding fingers to contact a guiding surface external and adjacent to the bore prior to their entry into the cylinder, the guiding surface being preferably slightly larger than the bore so that the fingers will be forced to contract as they enter the bore.

The invention also contemplates mechanical improvement in the construction of the boring bar and in particular the construction of the cutter guiding fingers which will be pointed out in detail below.

Referring to the drawings,

Fig. 1 is a vertical median section through a boring spindle embodying my invention;

Fig. 2 is an enlarged section of the lower portion of the spindle with the cutter shaft and the cutter holder removed;

Fig. 3 is a section on line 3—3 of Fig. 2;

Fig. 8 is a side elevation of a conventional boring machine embodying my invention;

Fig. 9 is a detail of such a machine, looking from the right in Fig. 8, showing an alternative method of initially guiding the cutter;

Fig. 10 is a detail, on a larger scale, of parts shown in Fig. 8; and

Figs. 11 and 12 are diagrammatic views showing the electrical and fluid pressure connections for one method of full automatic control of the cutter guiding devices.

The boring spindle in which the invention has been embodied for illustration comprises a sleeve 10 secured in any desired way to a movable member 11 which may be vertically or horizontally reciprocable and may be the carrier member for all of the spindles of a multiple spindle boring machine. In the present case the sleeve is shown as provided with a shoulder 12 which bears against the lower side of the member 11 and with a collar 13 threaded on its exterior which bears against the upper side of the member. The detailed method of securing is not important, and the sleeve and the member 11 can for practical purposes be considered as unitary.

Figure 4:
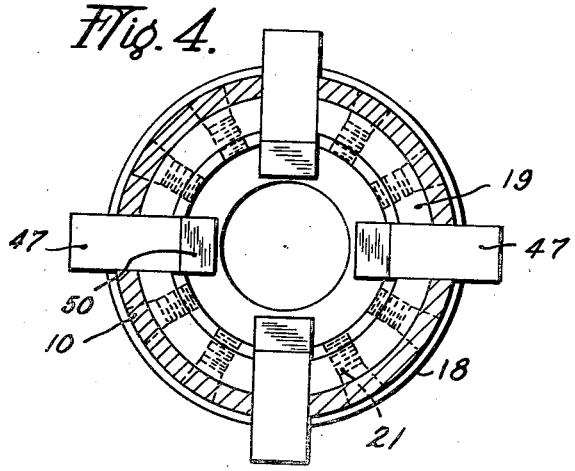
Fig. 4 is a section on line 4—4 of Fig. 2.
Figure 5:
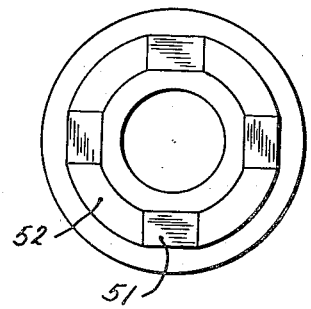
Fig. 5 is a bottom view of the guide finger expanding member shown in side elevation in Fig. 7.
Figure 6:
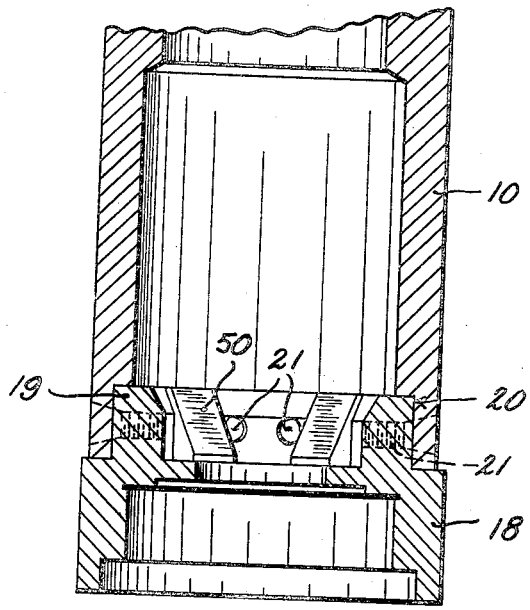
Fig. 6 is an enlarged section of the lower portion of the spindle, with all parts but the guide finger supporting cap removed.
Figure 7:
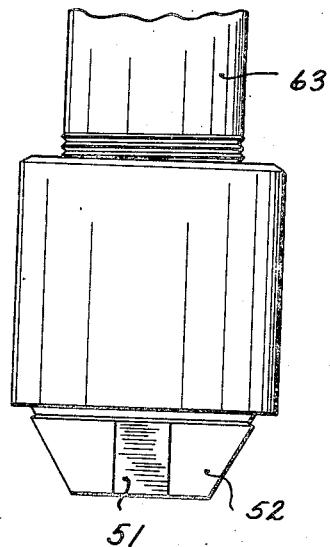
Fig. 7 is a side elevation of the lower portion of the guide finger expanding member.

At its upper end the sleeve supports the outer race 14 of a roller bearing 15 of the conical type serving to carry both radial load and axial thrust. The inner race 16 of this bearing supports the upper end of a cutter shaft 17 revolving freely inside of the sleeve. At its lower end the sleeve 10 bears a cap 18 best shown in Fig. 6, having a shouldered portion 19 fitting within a recess 20 in the sleeve and fastened in place by screws 21. This cap serves as a guide for certain centering fingers to be described and is made separate from the sleeve for convenience in manufacture and assembly. The cap is chambered internally to receive other parts, and carries the outer race 22 of a roller bearing 23 which is also of the conical or radial-thrust type. The inner race 24 of this bearing is carried by a cutter holder 25 fitted onto a taper 26 formed on the lower end of the shaft 17 and secured thereon as by threads 27. The lower side of the cutter holder is open for convenience in manufacture and is closed by a plate 28 forming one wall of a radial slot 29 in which a cutter 30 may be inserted. This cutter is of the extensible type fully described in the Arp Patent 1,906,241, May 2, 1933, and when set to a predetermined overall length outside of the cutter head is inserted in the slot so that its inner end rests against a stop 31 which, while adjustable, normally remains in a fixed position. The operation and manner of setting of this cutter is fully set forth in the Arp patent and need not be further considered here. An oil packing 32 of any desired design is preferably located between the bearing 23 and the cutter head to prevent leakage of oil.

Above and resting against the inner race 16 of the upper shaft bearing 15 is a pinion 35 keyed to the shaft at 36 and conveniently serving as a connection to any desired source of power by which the shaft may be rotated. It will be understood that the shaft is rotated in timed relation to the reciprocatory movement of the member 11 so that the cutter describes a helical path through the cylinder to be bored. A washer 37 rests on the pinion, and a heavy spring 38 is compressed between this washer and a collar 39 threaded onto the shaft at 40 and held in adjusted position by a set screw 41. This compression spring acts to draw the shaft 17 upwardly with respect to the sleeve 10 to the extent permitted by the bearings 15 and 23, preloading these bearings sufficiently to prevent any lateral movement of the shaft with respect to the sleeve.

In aligned slots 45 and 46 (Fig. 3) formed in the sleeve 10 and the shouldered part 19 of the cap 18 respectively slide a plurality of guide fingers or cat's-paws 47. In the case shown there are four sets of slots and four guide fingers spaced equally around the periphery of the sleeve. Each finger is preferably beveled on its lower outside edge as at 48 for a purpose to be described. The inner ends of the guide fingers are likewise beveled at 50 for contact with portions 51 of a cone 52. The portions 51 may be flattened as shown or may be left as a part of the conical surface. The particular relationship of the cone to the fingers will be considered at length below. Each finger is held in contact with the cone by a spring 53 located in a recess 54 in the lower part of the finger and pressing against a pin 55 secured to the cap 18.

The cone member 52 is provided with a keyway 60 in which fits a pin 61 secured to the sleeve 10 to prevent the cone from rotating while permitting it to move axially. The cone is threaded at 62 to a tube 63 extending between the sleeve 10 and the shaft 17 and free from each. At its upper end the tube is threaded at 64 to a sleeve 65 having a keyway 66 in which fits a pin 67 secured to the sleeve 10. A spring 68 rests against the shouldered upper end of the sleeve 65 and is held under compression by a collar 69 threaded into the interior of the sleeve 10. An oil packing 70 is preferably positioned within a recess in the upper side of the sleeve 65 to prevent oil from the bearing 15 from running down the space between the tube 10 and the shaft 17. A shaft 71 is journaled in the member 11 and passes through a hole 72 in the sleeve 10, the hole 72 being preferably made larger than the shaft so as to avoid difficulty in assembly. The inner end of the shaft 71 has an eccentric portion 73 fitting loosely in a slot 74 formed in the sleeve 65. The shaft 71 is provided with means, later to be described, by which it may be rotated to bring the eccentric 73 either into a position in which it compresses the spring 68 or into the position shown in Fig. 1 in which the eccentric is lowered sufficiently to release the spring and permit it to force the cone member downwardly. The slot is made deep enough so that in the latter position of the eccentric the spring will be resisted by the contact of the guide fingers 47 with the bore and not by contact of the upper portion of the slot with the eccentric.

Before considering the manner in which the device is controlled, the operation of the parts already described will be dealt with more fully since various novel functions are attained. In prior devices the guide fingers have been made wholly non-yielding, or have been made non-yielding inwardly but provided with a spring take-up to permit them to move outwardly as dust and chips cleared from between the guide fingers and the bore wall. Neither of these methods of mounting are entirely suited for automatic operation. Non-yielding guide fingers, if not provided with a spring take-up, may be set to their fixed diameter with some of the fingers held out of contact with the bore wall by dust or chips, and the series of fingers thus left loose in the bore. Non-yielding fingers, whether or not provided with a spring take-up, are subject to injury if, for example, the cutting point of the tool 30 should break off during the boring operation, causing the guide fingers to meet a suddenly constricted portion of the bore. While wholly yielding fingers would meet the latter condition, they would also permit the reaction of the cutter to shift the axis of the boring bar, notably where the cut being taken is not concentric with the previously bored hole.

The guide finger mounting of the present invention avoids all of the difficulties of these prior devices by causing the fingers to be rigid until a predetermined load is applied and to be yielding thereafter. By suitable design the predetermined load can be taken at a point such that the reaction of the cutting tool will cause no motion of the axis of the boring bar, whereas if a constriction in the bore is encountered the fingers will contract or collapse. This novel result is accomplished by having the spring 68 act upon the fingers through the intervention of the cone 52, and permitting the spring to be free at all times to permit the fingers to move outwardly or inwardly as may be required to keep them in contact with the bore wall. If the angle of the cone were steep enough so that the angle of contact between it and the wedge-shaped ends of the guide fingers were less than the angle of repose, the wedge would become self-locking, and no inward pressure on the fingers would cause them to move, no matter how heavy this pressure might be. In accordance with the present invention the apex angle of the cone is sufficient so that the contact angle is greater than the angle of repose, and if the contact surfaces were completely frictionless the fingers would act as if spring-supported. Since these surfaces are not frictionless the pressure of the spring and the friction on the wedge surfaces combine to cause the fingers to act as if locked at low inward pressures on the fingers, and to be released for full spring support only when a predetermined inward pressure is reached. The condition of equilibrium is determined by the standard equation for the wedge in which friction is taken into account, considering for simplicity two fingers only.

$$P = \frac{2W \cos \phi \sin (\alpha - \phi)}{\cos (\alpha - 2\phi)}$$

where

P is the pressure of the spring just necessary to keep the fingers from moving inwardly
W is the pressure inwardly on each finger
$\phi$ is the angle of friction
$\tan \phi = \mu$ where $\mu$ is the coefficient of friction
$2\alpha$ is the apex angle of the cone This formula will be found, together with a discussion, on page 140 of Analytical Mechanics for Engineers, by Seely and Ensign, New York, 1927. Using this formula and assuming an apex angle of 60° and a coefficient of friction of 0.25, this shows that a spring pressure of about 27 pounds will hold the fingers fixed against any movement until a pressure of 50 pounds on each of two opposite fingers is reached, which has been checked closely by experiment.

The limiting condition can be varied by changing either the apex angle of the cone or the strength of the spring. Decreasing the apex angle without changing the spring increases the pressure necessary to be exerted on opposite fingers to cause them to move inwardly, or in other words increases the range within which the fingers are rigid. It also increases the effect of a spring of given strength after the fingers begin to move, but not in the same proportion. It is possible with a rather low apex angle to use a long spring without sacrificing the rigidity of the fingers under low loads and thus decreasing the stiffness of the assembly at loads sufficient to cause movement of the fingers.

Even though the angle of the cone be taken so blunt as to lower the locking range below the reaction pressure of the cutter, a much more stable system will result by having one spring act on all guide fingers than by having individual springs acting on each member. Assuming a frictionless cone to illustrate the point, an inward pressure on one finger due to lateral shifting of the shaft will be resisted by the full force of the single spring, since by a lateral movement of the axis the pressure on the fingers away from which the movement takes place is removed. Were separate springs to be provided for each finger, the resistance to lateral movement of the cutter shaft would be only the difference in the compressive forces on the opposing springs due to the amount of deflection. For small deflections this would be very slight and the cutter head would be correspondingly unstable.

The construction described above lends itself to the production of other novel functions by the provision of suitable control mechanism about to be described. In prior devices for guiding the cutter of a boring bar through the bore by contact with the freshly bored wall it has been necessary to set the guide to exactly the diameter of the bore before starting the cut or to actuate the guide adjusting means manually after the boring operation has proceeded sufficiently to bring the guide within the bore. It has also been necessary to make manual adjustment of the guiding device at the end of the stroke to permit it to be drawn back through the cut bore. These operations are not suited to modern conditions of production but with the type of mechanism hitherto available they have been necessary. By use of the guide finger control devices described above automatic control is for the first time made possible, and while various types of automatic control may be used one suitable form will be set forth below.

In Fig. 8 the boring head has been shown as mounted in a conventional type of boring machine having a vertically reciprocated head 80 and a work table 81. Power for rotating the shaft 17 and for reciprocating the head 80 is shown as being supplied through shafts 82 and 83 respectively. The work piece 84 is shown as secured to the work table by any suitable clamps or fixtures 85. These parts being conventional they need not be described more in detail. The shaft 71 which releases the sleeve 63 is shown in Figs. 8 and 11 as being provided with a pinion 86 meshing with a rack 87 fixed to the rod of a piston 88 running in a cylinder 89. A pipe 90 running from one end of the cylinder is joined to a relief valve 91 and to supply valve 92 jointly controlled by solenoids 93 connected in series. The supply valve 92 is joined by a pipe 94 with a pump 95 for some fluid such as air under pressure. The valves 91 and 92 are arranged so that when one is open the other is shut, the solenoids being arranged when actuated to open the supply valve and to close the relief valve, and when released to close the supply valve and to open the relief valve. The other end of the cylinder 89 is connected by a pipe 96 with a relief valve 97 and a supply valve 98 controlled by solenoids 99 in series, the valve 98 being also connected to the pump by the pipe 94.

A suitable electrical control is provided so that the expansion and contraction of the guide fingers may be controlled automatically in accordance with the position of the boring bar. To this end a pair of limit switches 100 and 101 are mounted on the frame of the boring machine and are actuated respectively by lugs 102 and 103 adjustably mounted in ways 104 on the head 80. The lug 102 is shown on a larger scale in Fig. 10 to illustrate a construction preferred when the fingers are to be expanded automatically after they have gone a predetermined distance into the bore. In this case the fingers must not be expanded during their upward stroke, so that the lug 102 is pivoted at 104 to an adjustable support 105, is held against motion in one direction by a stop 106, and is permitted to yield in the other direction by a spring 107. On its upward stroke the lug yields, while in the other direction it is rigid and closes the limit switch.

The limit switch 100 is connected to one side of the main line 110, and is joined by a wire 111 to the coil 112 of a circuit breaker to be described, the circuit continuing through wires 113 and 114 to the second side 115 of the main line. A wire 117 also connects the switch 100 with the solenoid 118 of a relay 119 which acts to short-circuit the switch 100, current passing from the solenoid 118 to the contacts 120 and 121 of a second circuit breaker 122, through the solenoid 99 which operates the valve 97 and 98, and finally back through the wire 114 to the line 115. The parts connected with switch 101 are exactly the same and have been denoted by primed numerals.

The relays 119 and 119' are merely for the purpose of insuring a permanent flow of current upon a momentary depression of the switches 100 or 101. When the switch 100, for example, has been closed the current in the coil 118 will close the relay 119, and since current can flow through the coil as long as the breaker 122 remains closed the relay 119 will remain closed as long as the breaker is not affected. Upon the closure of switch 100, however, current momentarily flows through the coil 112 of the circuit breaker 122' associated with the switch 101, and will thus release the relay 119' which bridges the latter switch. Closure of either switch thus acts to energize the solenoid valves associated with it and to deenergize the whole circuit, including the solenoid valves, associated with the other switch. To make this clearer the circuit has been shown in Fig. 12 in the condition that it assumes upon the closure of switch 100, with those portions of the circuit in which current is flowing indicated in heavy lines.

Referring back to Fig. 8, in which the boring bar is shown at the top of its stroke, it is to be assumed that the guiding fingers have been retracted by the previous actuation of switch 101, and that the lug 102 has ridden lightly over the switch 100 on the ascent of the head 80 without closing the switch. On the downward stroke the cutter is carried into the bore with the guide fingers still contracted, the lug 102 being preferably set so as to close the switch 100 as soon as the fingers are wholly within the bore. During the preliminary part of the boring operation the bar is conveniently guided by a bearing 125 adjustably held in close relation to the top of the hole to be bored.

It will be seen that in accordance with the control system just described the guide fingers will be expanded automatically into contact with the freshly cut bore just as soon as the bore has been completed sufficiently to receive the fingers. After this the cutter will be under the direct control of the guide fingers throughout the progress of the boring operation. As soon as the cutter has passed through the lower end of the bore the switch 191 will be closed and the guide fingers will be contracted so that the cutter may be drawn upwardly without causing the fingers to drag over the bore during the rapid ascent of the bar. It is generally preferable to offset the work piece somewhat from its cutting position before drawing the bar upwardly in order to space the cutter from the wall and thus to avoid scratching it.

Under certain conditions improved results may be obtained by a slightly different method of guiding the cutting during the initial part of the boring operation. For this purpose a guide member, conveniently made in the form of a ring 130 (Fig. 9) where the conformation of the work piece permits, is secured rigidly in place above the work piece in accurate alignment with the cutter axis and the fingers 47 expanded into contact with it before the cutter comes into contact with the bore wall. A very rigid guide is thus provided which will prevent any distortion due to flexing of the bar between the guide 125 and the work piece. The guide member or ring is preferably made of very slightly larger diameter than the bore to be cut, so that the cutter may revolve within it without marring its inner surface. When the guide fingers pass from the ring into the freshly cut bore they are forced to contract slightly by contact of their beveled lower surfaces with the upper edge of the bore, this being permitted by the action of the wedge cone as previously described. This manner of operation has the additional advantage that the guide fingers slide smoothly into the bore rather than being moved radially outwardly into contact with it, so that any dust or chips will not be caught between the outer ends of the fingers and the bore wall. This avoids any temporary or permanent flexing of the bar by reason of the fingers not being permitted by such a chip to expand until all of them are in full contact with the bore. The ring 130 may be made part of a suitable work holding fixture, but is shown as being held by studs 131 to the top of the work piece. In this case it is not necessary that the lug 102 be made yielding, as the fingers may be expanded as soon as they reach the interior of the ring on the upward stroke of the bar.

If desired, the same procedure may be followed without the use of the ring, the fingers being expanded before they descend into the bore and being forced to contract into the bore by contact of their beveled lower surfaces. When this manner of operation is to be followed the maximum expanded diameter of the fingers should be made very slightly greater than the diameter of the bore to be cut.

I claim:

1. A boring device comprising a rotatable cutter head, means for reciprocating and rotating the cutter head, a guide head mounted to the rear of the cutter head for reciprocation therewith, means for holding the guide head against rotation, a plurality of guide members radially movable in the guide head, a device having positive wedge-like connection with all of the guide members for moving them simultaneously in an outwardly radial direction, a yielding pressure device for forcing the wedge device against the guide members, power means for shifting the wedge device in a direction opposite to that given to the wedge device by the yielding pressure device, and control means for the power means including a trip operable at a predetermined point in the reciprocatory motion of the cutter head.

2. A boring device comprising a rotatable cutter head, means for reciprocating and rotating the cutter head, a guide head mounted to the rear of the cutter head for reciprocation therewith, means for holding the guide head against rotation, a plurality of guide members radially movable in the guide head, a device having positive wedge-like connection with all of the guide members for moving them simultaneously in an outwardly radial direction, a yielding pressure device for forcing the wedge device against the guide members, the angle of the wedge being such as to prevent slippage relative to the members and thus make it irreversible in action under the normal thrust exerted upon the guide members by the pressure of the cutter in the bore but reversible to permit slippage relative to the members and thus permit inward movement of the members against the force of the yielding pressure device under conditions of overload, power means for shifting the wedge device in a direction opposite to that given to the wedge device by the yielding pressure device, and control means for the power means including a trip operable at a predetermined point in the reciprocatory motion of the cutter head.

3. A boring device comprising a rotatable cutter head, means for reciprocating and rotating the cutter head, a guide head mounted to the rear of the cutter head for reciprocation therewith, means for holding the guide head against rotation, a plurality of guide members radially movable in the guide head, a device having positive wedge-like connection with all of the guide members for moving them simultaneously in an outwardly radial direction, a spring pressing against the wedge device in a direction to cause it to force the guide members outwardly, power means for shifting the wedge device in the opposite direction against the force of the spring, and control means for said power means including a trip operable at a predetermined point in the reciprocating motion of the cutter head.

4. A boring device comprising a rotating cutter shaft, a cutter carried thereby, a circumferential series of guide members guided for radial movement in position to follow the cutter through the bore, a device having wedge contact with the guide members for moving them radially outwardly, yielding means common to all the guide members for causing relative movement between said device and said guide members in a direction to cause said series of guide members to be expanded by wedge action, means for controlling the operation of said yielding means during the rotation of the cutter shaft, and means for actuating said controlling means including a trip operable at a predetermined point in the reciprocatory motion of the cutter head.

FRANCIS P. HEALY.